(12) United States Patent
Xiao et al.

(10) Patent No.: US 7,193,021 B2
(45) Date of Patent: Mar. 20, 2007

(54) SOLUBLE ANILINE-THIOPHENE COPOLYMERS

(75) Inventors: Steven Shuyong Xiao, Laval (CA); Chunong Qiu, Brossard (CA); Cindy Xing Qiu, Brossard (CA)

(73) Assignee: Organic Vision Inc, Brossard (CA)

( * ) Notice: Subject to any disclaimer, the term of this patent is extended or adjusted under 35 U.S.C. 154(b) by 0 days.

(21) Appl. No.: 10/918,804

(22) Filed: Aug. 16, 2004

(65) Prior Publication Data
US 2006/0036065 A1  Feb. 16, 2006

(51) Int. Cl.
C08F 283/00 (2006.01)
C08G 73/00 (2006.01)

(52) U.S. Cl. .................. 525/535; 525/540; 528/373; 528/377

(58) Field of Classification Search ................ 525/535, 525/540; 528/373, 377
See application file for complete search history.

(56) References Cited

OTHER PUBLICATIONS

Hosseini et al, Chemical and electrochemical - - - vapor sensing, 2001, John Wiley & Sons Ltd, Chem Abstract 136: 38183.*
Ueda et al, Styryl containing polymer - - - using it, 1998, Jpn. Kokai Tokkyo Koho, Chem Abstract 130: 59045.*

* cited by examiner

Primary Examiner—Duc Truong

(57) ABSTRACT

The present invention discloses soluble copolymers of aniline and thiophene having a general formula I.

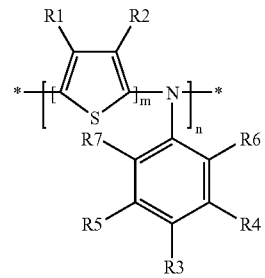

Formula I

Wherein: m and n each independently represents an integer, with $m \geq 1$ and $n \geq 2$. R1, R2, R3, R4, R5, R6 and R7 each independently represents, hydrogen atom, or a liner or branched or cyclo aliphatic group having from 1 to 20 carbon atoms, or an aromatic group having from 5 to 30 carbon atoms, or any other functional group, but at least one among R1, R2, R3, R4, R5, R6, and R7 is not a hydrogen atom.

The present invention also teaches methods for the synthesis, characterization and application of the disclosed copolymers.

8 Claims, 2 Drawing Sheets

SOLUBLE ANILINE-THIOPHENE COPOLYMERS

FIELD OF THE INVENTION

This invention relates to structures of soluble aniline-thiophene copolymers and the methods of preparing the same.

BACKGROUND OF THE INVENTION

Conducting polymers have electronic properties of inorganic semiconductor and engineering properties of plastic, and are being explored for variety of opto-electronic applications including light emitting diodes, solar cells, sensors, transistors, anti-corrosion, electromagnetic shielding, data storage and many others. Among the various conducting polymers studied, polythiophenes and polyanilines are the most promising for many industrial applications.

Polythiophene has demonstrated a large number of unique physical properties, such as, thermochromism, electrochromism, solvatochromism, luminescence, and photoconductivity. Polyaniline has exceptional properties such as reversible protonic dupability, excellent redox re-cyclability, and chemical stability. It is desirable to strategically combine the properties of polyaniline and polythiophene by making a copolymer with both aniline and thiophene segments along the polymer backbone. However, their generic insolubility in common organic solvents has practically limited this approach.

OBJECTIVE OF THE INVENTION

One objective of the present invention is to provide designs of copolymers of thiophene and aniline with sufficient solubility in common organic solvents.

Another objective of the present invention is to provide synthesis procedures for the invented copolymers.

Still another objective of the present invention is to provide potential applications of the invented copolymers.

DETAILED DESCRIPTION OF THE PREFERRED EMBODIMENTS

Figure 1:
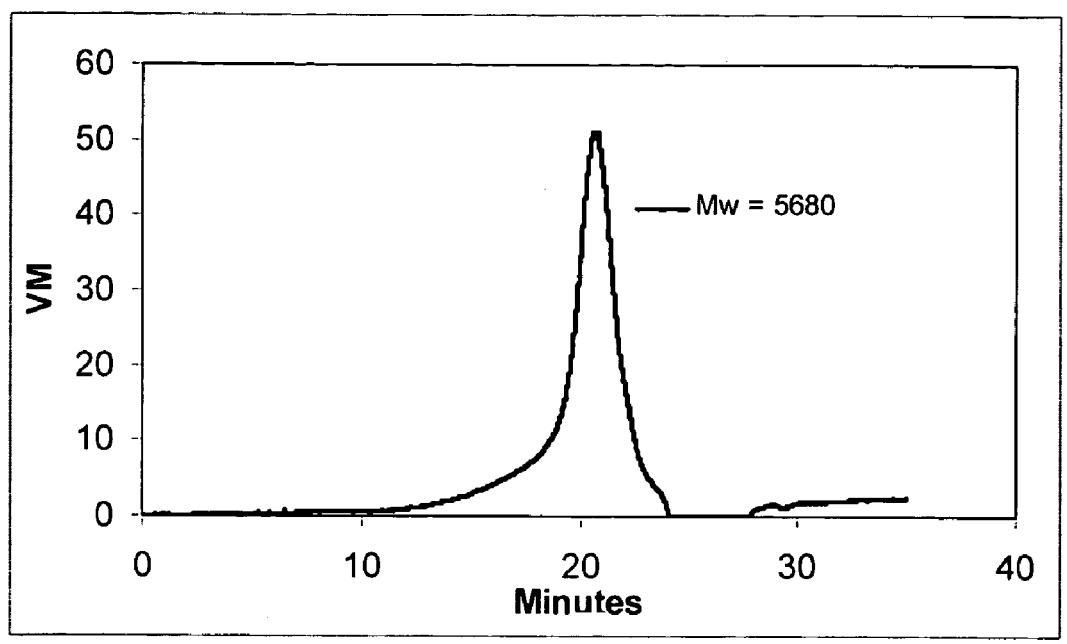
FIG. 1 presents a molecular weight distribution of the copolymer 2 as determined from GPC measurements.

This invention relates to the structure and the preparation of soluble aniline-thiophene copolymers. More specifically, this invention relates to the processes for making soluble conducting copolymers containing aniline and thiophene group in the polymer backbone having a general formula I:

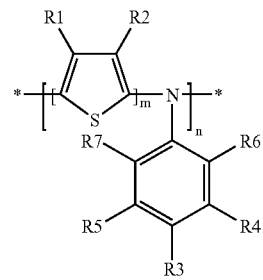

Formula I

Wherein: m and n each independently represents an integer, with $m \geq 1$ and $n \geq 2$. R1, R2, R3, R4, R5, R6 and R7 each independently represents hydrogen atom (but at least one of R1, R2, R3, R4, R5, R6 and R7 is not hydrogen), alkyl, alkenyl, alkynyl, aryl, alkylaryl, CN, $CF_3$, $C_nF_2F_{2n+1}$, trifluorovinyl, $CO_2R$, $C(O)R$, $NR_2$, $NO_2$, OR, halo, heteroaryl, substituted aryl, substituted heteroaryl or a heterocyclic group, and additionally, or alternatively, any one or more of R1 and R2 or R7 and R5, or R5 and R3, or R3 and R4, or R4 and R6 together form, independently, a fused 5- to 6-member cyclic group, where the cyclic group is cycloalkyl, cycloheteroalkyl, aryl, or heteroaryl. The fused 5- to 6-member cyclic group may be optionally substituted with one or more of alkyl, alkenyl, alkynyl, alkylaryl, CN, $CF_3$, $C_nF_{2n+1}$, trifluorovinyl, $CO_2R$, $C(O)R$, $NR_2$, $NO_2$, OR, halo; each R is independently H, alkyl, alkenyl, alkynyl, alkylaryl, and aryl.

Preferably in copolymers of Formula I, R1, R2, R3, R4, R5, R6 and R7 may independently be hydrogen, substituted or un-substituted monovalent hydrocarbon groups having typically from 1 to 30 carbon atoms. Examples of alkyl groups include methyl, ethyl, propyl, butyl, pentyl, hexyl, heptyl, octyl, decyl, dodecyl, steryl, cyclopentyl, and cyclohexyl groups. Examples of alkenyl groups include vinyl, allyl, hexenyl, heptenyl, octenyl, and aryl groups such as phenyl, alkylphenyl and alkoxyphenyl.

In another embodiment for copolymers of Formula I, R1, R2, R3, R4, R5, R6, and R7 may independently be alkoxy groups include the alkyl and alkenyl groups listed above linked by an oxygen atom.

Additionally in copolymers of Formula I, two adjacent groups such as R1 and R2, R3 and R4, R3 and R5, R5 and R7, and R4 and R6 may combine to form a cyclo-groups or hetroatomic cyclo-groups, for example:

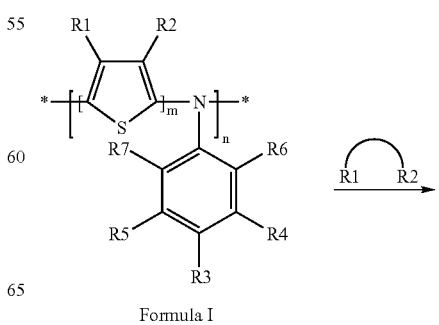

Formula I

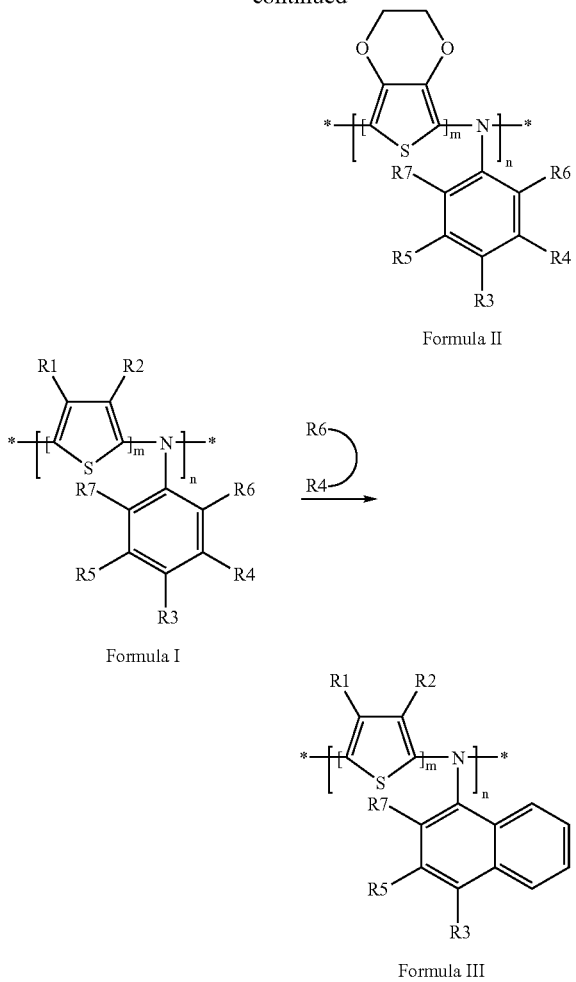

Formula I

Formula II

Formula III

Where R3, R4, R5, R6, and R7 in copolymers of Formula II and R1, R2, R3, R5 and R7 in copolymers of Formula III has the same definition as in copolymers of Formula I described above.

Still in another embodiment, R1, R2, R3, R4, R5, R6 and R7 in copolymers of Formula I may independently also represent any functional group such as cyano, isocyano, hydroxyl, halide, amino, sulfonate, etc.

Another embodiment of this invention is to teach how to synthesize the copolymers of Formula I.

Two principal polymerization mechanisms are used as examples in this invention. One is similar to the Buchwald-Hartwig reaction where one type of monomers have two halide groups and another type of monomers have two protons, as exampled in reaction scheme 1 (see Example section below). The other is similar to the direct oxidizing thiophene, where the polymerisable groups in the monomer are two thiophene derivatives, as exampled in reaction scheme 2 (see Example section below).

In a typical Buchwald-Hartwig reaction, phosphine ligands including P(o-toyl)$_3$, BINAP, and DPPF are used to form palladium complexes as catalysts for amination of aryl bromides or aryl iodides with amino compounds. However, for synthesis of copolymers disclosed in this invention, a bulky and electron-rich ligand, P(t-Bu)$_3$ is mostly preferable.

For the direct oxidizing polymerization, ferric chloride is preferable as the oxidizing agent.

It is thus still another embodiment of this invention to demonstrate how to test and use copolymers of Formula I.

Conducting polymers having electronic and opto-electronic properties similar to inorganic semiconductor materials have been employed in the fabrication of various electronic and opto-electronic devices. These organic semiconductor devices include but not limited to organic thin film transistor, organic photovoltaic devices for solar electricity, photo detector, organic solid state laser, organic solid state lighting, organic thin film memory for data storage, organic sensor for bio-application and chemical detection, and organic light emitting diode for flat panel applications. More preferably, the polymers of Formula I according to this invention are suitable for organic transistors, electromagnetic shielding, anti-static coating, anti-corrosion coating, charge-transporting materials for organic light emitting diodes and photovoltaic devices.

To make use of conducting polymers for any opto-electronic applications, it requires depositing a thin layer of these polymers onto a substrate. Since the polymers of Formula I according to this invention are soluble in a proper solvent, it is preferable to formulate solutions or inks with these polymers. The formulated inks are thus preferably to be applied on a substrate by spin-coating, ink jet or screen printing, spray coating or dip coating. The formulation of conducting polymer inks and the application of the formulated conducting polymer inks are well known to those skilled in the art.

In the subsequent part of this invention, some examples on the synthesis, characterizations and applications of the invented copolymers are described. It should be noted that these examples are presented for illustration purposes only and are not presented to limit the scope of this invention.

EXAMPLES

In the following examples, chemical reagents are purchased from Sigma-Aldrich Canada Ltd. unless otherwise specified.

Example I

Synthesis of Copolymer I

The copolymer I was synthesized according to Reaction Scheme I.

Reaction Scheme I

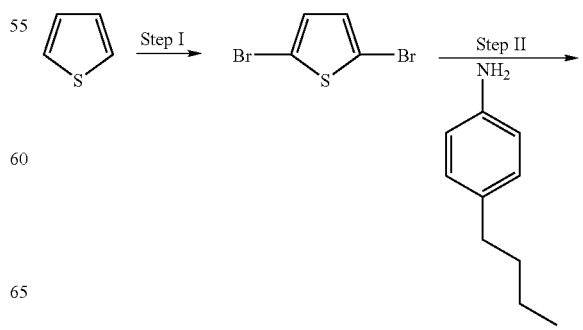

-continued

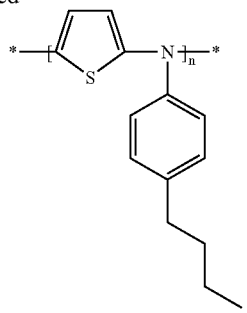

Step I A 1,000 mL of 3-neck round-bottom flask, equipped with an addition funnel, was swept with nitrogen gas for 30 minutes, and then wrapped with aluminum foil to avoid light penetration. 300 ml of anhydrous DMF (300 mL) and 42.07 g of thiophene (42.07 g, 0.5 mol.) were charged into this flask forming a clear colorless solution. A yellow solution of N-bromosuccinimide (NBS, 195.79 g, 1.1 mol.) in anhydrous DMF (300 mL) was added into this solution drop by drop. The resulting yellow solution was stirred at room temperature for 48 hours under dark conditions.

The mixture was slowly poured into a well-stirred ice-water (300 mL), and the resulting yellow suspension was stirred for two hours until it turned into a pale yellow suspension. The suspension was extracted with ether (4×200 mL), and the combined ether layer was then washed with water (2×100 mL) and dried using magnesium sulfate. After that, the inorganic salt was removed by filtration, and the solvent was removed by rotary evaporation to yield 140.5 g of red liquid residue. The collected red liquid residue was finally purified by a silica gel column with hexanes as an eluent to obtain 110.44 g of colorless 2,5-dibromothiophene with a yield of 91.3%.

Step II A clean 500 mL 3-neck round-bottom flask equipped with a condenser in the middle neck, a nitrogen inlet and an electronic thermometer on the side necks was placed on a magnetic stirrer. Under continuous nitrogen flow, the flask was dried with a propane torch and then allowed to cool down to room temperature. 180 mL of anhydrous toluene was poured into this flask, and the solvent was degassed with nitrogen bubbles for 30 minutes. Palladium acetate (0.11 g, 0.5 mmol.) and tri-t-butylphosphine (0.40 g, 2.0 mmol.) were dissolved in toluene and the resulting light yellow solution was stirred at room temperature till it turned into thick and light yellow suspension. Then 4-butylaniline (1.5 g, 10 mmol.), 2,5-dibromothiophene (2.42 g, 10 mmol.; obtained in step I) and sodium t-butoxide (2.11 g, 22 mmol.) were successively added into this suspension, and the resulting light brown mixture was heated at 80° C. overnight.

The reaction mixture was slowly poured into a well-stirred methanol (1,000 mL), and a brownish precipitation slowly appeared. The precipitates were stirred further for two hours, and were filtered and dried. The crude product was dissolved in 50 mL of chloroform and re-precipitated in 500 mL of methanol. Copolymer 1 (1.35 g, 45.0%) in brown powder form was obtained after filtration, washed with methanol, and dried in a vacuum oven for 12 hours.

The molecular weight of copolymer I was determined by Gel Permeation Chromatography (GPC). Chloroform was used as eluent and polystyrene standards were used as reference. GPC analysis of copolymer I yielded a molecular weight (MW) of 7728 with poly-dispersion-index (PDI) of 2.12.

Example II

Synthesis of Copolymer II

The copolymer II was synthesized following Reaction Scheme II as illustrated below:

Reaction Scheme II

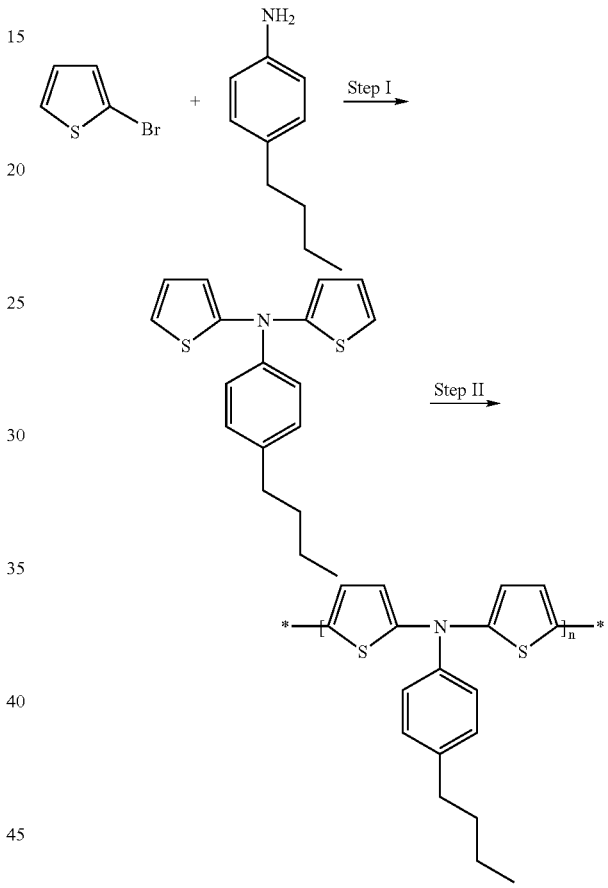

Step I A clean 500 mL 3-neck round-bottom flask equipped with a condenser in the middle neck, a nitrogen inlet and an electronic thermometer in the side necks was placed on a magnetic stirrer. Under continuous nitrogen flow, the flask was dried with a butane torch and then allowed to cool down to room temperature. Anhydrous toluene (250 mL) was poured into this flask and the solvent was degassed with nitrogen bubbles for 30 minutes. Palladium acetate (0.31 g, 1.4 mmol.) and tri-t-butylphosphine (0.85 g, 4.2 mmol.) were dissolved in toluene and the resulting light yellow solution was stirred at room temperature until it turned into thick and light yellow suspension. 4-butylaniline (3.00 g, 20 mmol.), 2-bromothiophene (2.42 g, 50 mmol), and sodium t-butoxide (5.8 g, 60 mmol.) were successively added into this suspension and the resulting light brown mixture was heated at 80° C. overnight. The reaction mixture was washed with water three times in a separation funnel and then transferred to a 500 mL evaporation flask. Solvent was then removed by a rotary evaporator, and the residue was purified through a silica gel flash chromatography column with hexanes as an eluent to yield 3.8 g (60.6%) of purified intermediate, N,N-bis(2-thioeno)-4-butylaniline in a form of yellow viscose liquid.

Step II A clean 1,000 mL 3-neck round-bottom flask equipped with a condenser in the middle neck, a nitrogen inlet and an electronic thermometer in the side necks was placed on a magnetic stirrer. Under continuous nitrogen flow, the flask was dried with a butane torch and then allowed to cool down to room temperature. 500 mL of chloroform was poured into this flask and the solvent was degassed by blowing nitrogen bubbles for 30 minutes. N,N-bis(2-thioeno)-4-butylaniline (2.20 g, 7.0 mmol., obtained from step 1) and anhydrous ferric chloride (4.54 g, 28 mmol.) were quickly added into the solvent and the resulting black suspension was heated to 40° C. and stirred at this temperature for 48 hours. The excess solvent was removed using a rotary evaporator until about 100 mL of the mixture is left. This mixture was then slowly poured into 1,000 mL of methanol under vigorous stirring. The crude polymer was collected by filtration and then it was washed with methanol. The collected crude polymer was re-dissolved in chloroform and precipitated in methanol. After filtration, washed with methanol, dried in a vacuum oven at 50° C. for 24 hours, 1.60 g (73.4%) of Copolymer II in a form of black lump was obtained.

The molecular weight of copolymer II was determined by Gel Permeation Chromatography (GPC). In this test, chloroform was used as eluent and polystyrene standards were used as reference. GPC analysis of copolymer II yielded a molecular weight (MW) of 5680 with poly-dispersion-index (PDI) of 4.1.

Example III

Synthesis of Copolymer III

The copolymer III was synthesized following Reaction Scheme III as illustrated below:

Reaction Scheme III

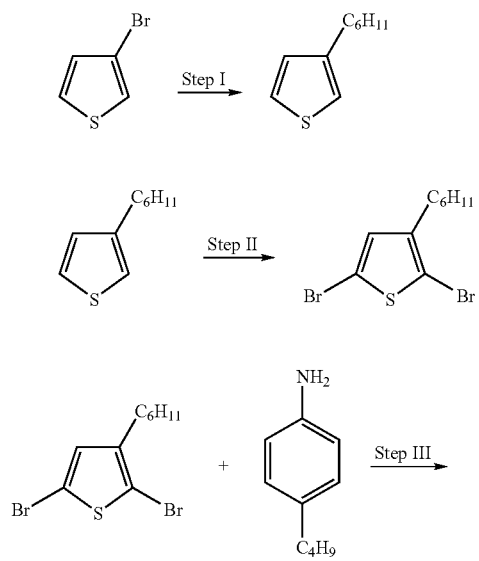

-continued

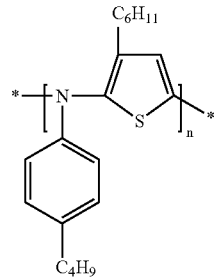

Step I A 1,000 mL 3-neck round-bottom flask, equipped with an addition funnel, was rinsed with anhydrous ether twice and swept with nitrogen for 30 minutes. Iodine (2.54 g, 10 mmol.) was added into a mixture of anhydrous ether (300 mL) and magnesium turnings (12.16 g, 0.5 mol.), which resulted in a mixture of red-brown color. The mixture was stirred until it turned into a pale yellow suspension. A solution of 1-bromohexane (66.03 g, 0.4 mol.) in anhydrous ether (100 mL) was slowly dropped into this suspension to keep the ether mildly boiling. The resulted dark grey solution was heated to reflux for two hours, and then allowed to cool down to room temperature. In an environment of nitrogen, the solution is transferred into a funnel through a cotton ball as a filter to remove un-reacted metal to offer a ready-to-use Grinard reagent.

Another 1,000 mL three-neck round-bottom flask was rinsed with anhydrous ether twice, swept with nitrogen for 30 minutes, and placed into an ice-bath. 3-bromothiophene (55.40 g, 0.34 mol.), [1,3-bis(diphenylphosphino) propane] dichloronickel (II) (1.84 g, 3.4 mmol.), and anhydrous ether (200 mL) were added into the flask and formed a red solution. The above obtained Grignard reagent was then dropped into this solution, and the resulted black mixture was allowed to warm up to room temperature and heated to reflux overnight.

The reaction mixture was allowed to cool down to room temperature, and then carefully hydrolyzed with 200 mL of 2.0 N HCl. The resulting brown mixture was stirred and transferred into a separatory funnel. The aqueous layer was separated and extracted with 2×50 mL of ether. The ether layers were combined, washed with water (2×50 mL) and dried over $MgSO_4$ for overnight. The inorganic salt and the solvent were removed by filtration and by rotary evaporation respectively. The light yellow liquid residue was purified using a silica gel column with hexanes as eluent. 44.80 g of colorless liquid was obtained with the yield of 78.3%.

Step II A 1,000 mL 3-neck round-bottom flask, equipped with an addition funnel, was swept with nitrogen gas for 30 minutes, and then wrapped with aluminum foil to block the light. A colorless solution of 3-hexylthiophene (16.83 g, 0.1 mol.) in anhydrous DMF (200 mL) was dropped into a yellow solution of N-bromosuccinimide (NBS, 39.60 g, 0.22 mol.) in anhydrous DMF (200 mL). The resulting yellow solution was stirred at room temperature for 48 hours.

The mixture was slowly poured into a well-stirred ice-water (300 mL), and the resulted yellow suspension was stirred for two hours until it turned into a white-yellow suspension. The suspension was extracted with 3×100 mL of ether, and the combined ether layers were washed with 100 mL of water and dried over magnesium sulphate. The inorganic salt was removed by filtration, and the light yellow filtrate was concentrated by rotary evaporation. The light red liquid residue was purified by a silica gel column with hexanes as eluent. Finally, 29.35 g of colorless 2,5-dibromo-3-hexylthiophene liquid was obtained with the yield of 90.0%.

Step III A clean 500 mL 3-neck round-bottom flask equipped with a condenser in the middle neck, a nitrogen inlet and an electronic thermometer in the side necks was placed on a magnetic stirrer. Under continuous nitrogen flow, the flask was dried with a butane torch and then allowed to cool down to room temperature. 200 mL of anhydrous toluene was poured into this flask and degassed with nitrogen bubbles for 30 minutes. Palladium acetate (0.11 g, 0.5 mmol.) and tri-t-butylphosphine (0.40 g, 2.0 mmol.) were dissolved in toluene and the resulted light yellow solution was stirred at room temperature until it turned a thick and light yellow suspension. 4-butylaniline (1.49 g, 10 mmol.), 2,5-dibromo-3-hexylthiophene (3.26 g, 10 mmol., obtained in step II) and sodium t-butoxide (2.11 g, 22 mmol.) were successively added into this suspension and the resulted light brown mixture was heated at 80° C. overnight. The reaction mixture was slowly poured into well-stirred methanol (1,000 mL). The resulted brownish black precipitates were stirred for two hours, and then filtered and dried. The dry crude product was re-dissolved in 50 mL of chloroform and precipitated in 50 mL of methanol. Copolymer III in a form of brownish black powder (2.01 g, 64.1%) was then obtained after filtered, washed with methanol and dried in a vacuum oven for 12 hours.

The molecular weight of copolymer III was determined by Gel Permeation Chromatography (GPC). In the GPC analysis, chloroform was used as eluent and polystyrene standards were used as reference. GPC analysis of copolymer III yielded a molecular weight (MW) of 17500 with poly-dispersion-index (PDI) of 11.

Example IV

Synthesis of Copolymer IV

The copolymer IV was synthesized following Reaction Scheme IV as illustrated below:

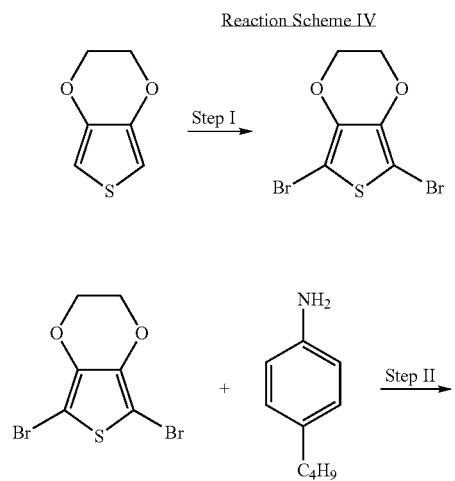

-continued

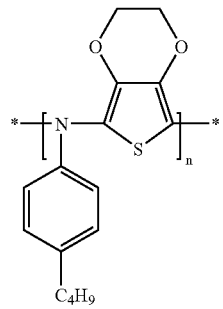

Step I A 500 mL 3-neck round-bottom flask, equipped with an addition funnel, was swept with nitrogen gas for 30 minutes, and then wrapped with aluminum foil to prevent light penetration. A yellow solution of N-bromosuccinimide (NBS, 19.58 g, 110 mmol.) in anhydrous DMF (100 mL) was dropped into a colorless solution of 2,3-dihydrothieno [3,4-b]-1,4-dioxin (7.11 g, 50 mmol.) in anhydrous DMF (100 mL). The resulted yellow solution was stirred at room temperature for 48 hours.

The mixture was slowly poured into a well-stirred ice-water (100 mL), and the resulted yellow suspension was stirred for two hours until it turned into a white-yellow suspension. The suspension was extracted with ether (4×100 mL) and the combined ether layers were washed with water (2×50 mL) and dried over magnesium sulfate. The inorganic salt was removed by filtration, and the light yellow filtrate was concentrated by rotary evaporation. The light yellow solid residue was purified by a silica gel column with toluene as eluent. After the solvent was removed by a rotary evaporator under reduced pressure, 12.77 g of product 2,3-dihydro [2,5-dibromothioeno][3,4-b]-1,4-dioxin in light yellow powder form was obtained with the yield of 85.3%. The final product in the evaporation flask was quickly placed in a refrigerator to avoid possible reaction before used for the next step.

Step II A clean 500 mL 3-neck round-bottom flask equipped with a condenser in the middle neck, a nitrogen inlet and an electronic thermometer in the side necks was placed on a magnetic stirrer. Under continuous nitrogen flow, the flask was dried with a butane torch and then allowed to cool down to room temperature. 200 mL of anhydrous toluene was poured in to this flask and degassed with nitrogen bubbles for 30 minutes. Palladium acetate (0.11 g, 9.5 mmol.) and tri-t-butylphosphine (0.40 g, 2.0 mmol.) were dissolved in toluene and the resulted light yellow solution was stirred at room temperature until it turned a thick light yellow suspension. 4-butylaniline (1.49 g, 10 mmol.), 2,3-dihydro[2,5-dibromothioeno][3,4-b]-1,4-dioxin (3.00 g, 10 mmol., obtained in step I) and sodium t-butoxide (2.11 g, 22 mmol.) were successively added, and the resulted light brown mixture was heated to and stayed at 80° C. overnight. The reaction mixture was slowly poured into a well-stirred methanol (1,000 mL). The resulted brownish black precipitates were stirred for two hours, and then filtered and dried. The dry crude product was re-dissolved in 50 mL of chloroform and precipitated in 500 mL of methanol. Copolymer III in a form of black powder (1.05 g, 36.5%) was then obtained after filtration, washed with methanol, and dried in a vacuum oven for 12 hours.

The molecular weight of copolymer IV was determined by Gel Permeation Chromatography (GPC). In the GPC analysis, chloroform was used as eluent and polystyrene standards were used as reference. GPC analysis of copolymer IV yielded a molecular weight (MW) of 3500 with poly-dispersion-index (PDI) of 1.15.

Example 5

Application of Copolymers in Thin Film Transistors (TFT)

Figure 2:
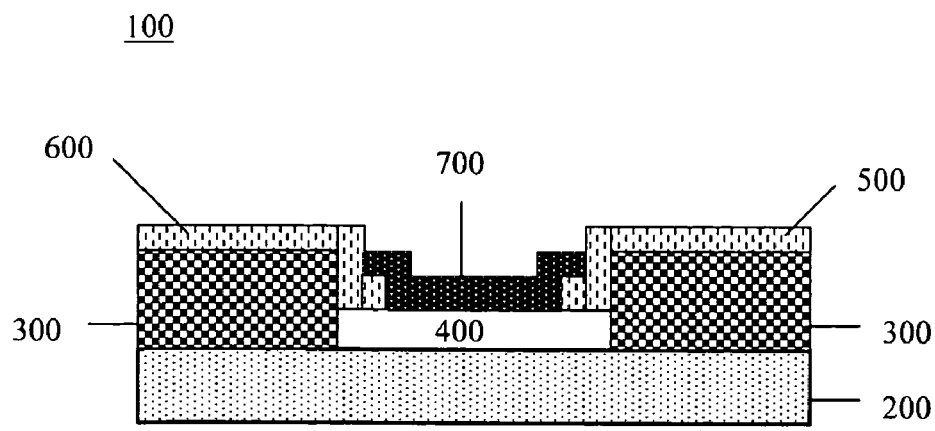
FIG. 2 shows an organic thin film transistor (100) fabricated using copolymer II of this invention, where (200) represents an n+-Si layer, (300) is a layer of silicon dioxide, (400) stands for a gate oxide layer, (500) and (600) represent the drain and source contacts and (700) is the active channel layer made of copolymer II.

Polymer thin film transistors (TFT) were fabricated to evaluate the charge mobility of copolymers of this invention. FIG. 2 shows a typical structure of a bottom-gate TFT (100) built on a $n^+$-Si substrate (200), where (300) represents a layer of thick silicon dioxide ($SiO_2$) and (400) a thin gate oxide. The gold contacts to the drain and source are represented by (500) and (600) respectively. Finally, a layer of copolymer II is acting as the active channel layer (700) in the TFT (100).

The $n^+$-Si substrate (200) used has an electronic resistivity of 0.02–1.00 Ω·cm. A wet thermal oxidation process was carried out to form a $SiO_2$ layer (300) to isolate the drain and source contacts (500, 600) and the silicon substrate (200). After gate window opening, a thin layer of gate oxide (300) with a thickness of about 100 nm was grown by a dry oxidation process. A gold (Au) film was then evaporated on the entire surface and this Au layer was subsequently patterned to form the drain and source contacts (500, 600). As a final step, copolymer II was dissolved in a mixture of toluene and chloroform and was spin-coated onto the TFT substrate to form the active channel layer (700). The channel width of the TFT (100) was about 75 μm and the channel length was in the range of 3–6 μm.

Figure 3:
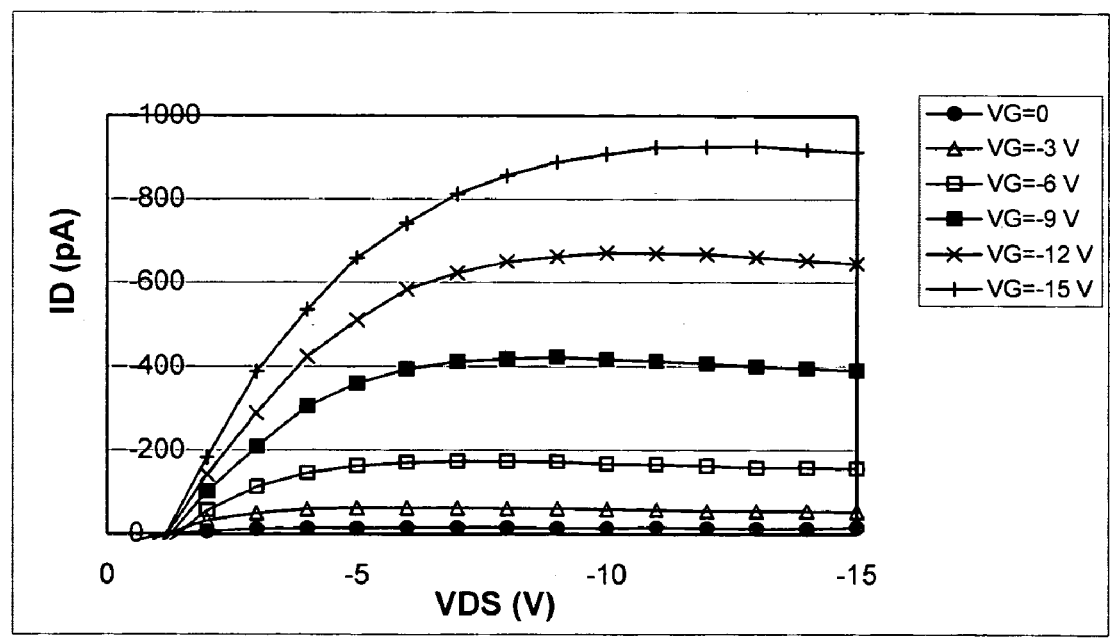
FIG. 3 presents I–V characteristics of an organic thin film transistor (100) fabricated with copolymer II disclosed in example 2 of this invention.

FIG. 3 demonstrates the drain current (I) vs. drain-source voltage (V) curves of the TFT (100) fabricated with copolymer II, showing typical I-V characteristics of a p-type transistor. The field effect mobility in the saturation region at certain drain and gate voltage was estimated by a well-acceptable equation (1).

$$I_{d,sat} = W/2L\ \mu C_i (V_g - V_t)^2 \qquad \text{Equation (1)}$$

Where $\mu$, $I_{d,sat}$, W, L, $C_i$, $V_g$ and $V_t$ are the field effect mobility, saturation drain current, channel width, channel length, unit capacitance of gate insulator, gate voltage, and threshold voltage, respectively. By using equation (1), we found the charge mobility of copolymer II to be about $10^{-4}$ $cm^2$/V.s.

Example 6

Application of Copolymers in OLED

A commercial ITO-coated glass is pre-cleaned by a conventional process. A layer of copolymer II is then spin-coated onto the ITO-coated glass from its chloroform solution to a thickness of about 0.1 μm. After the solvent is removed by baking the sample on a hot plate at a temperature of 120° C. for 30 minutes, a layer of MEH-PPV (available from Sigma-Aldrich Ltd.) is spin coated from a toluene solution. Finally, the magnesium-gold (Mg—Ag) cathode was thermally deposited onto the MEH-PPV polymer to have a polymeric light emitting diode with a layer structure of ITO/Copolymer II/MEH-PPV/Mg—Ag.

The fabricated polymer light emitting diode shows a typical organic diode characteristics and orange-red emission when voltages in the range of 3–15V is applied to the diode.

While the present invention is described with respect to particular examples and preferred embodiments, it is understood that the present invention is not limited to these examples and embodiments. The present invention as claimed therefore includes variations from the particular examples and preferred embodiments described herein, as will be apparent to ones skilled in the art.

What is claimed is:

1. A copolymer for electronic and opto-electronic applications made by a catalytic reaction between a functional thiophene monomer of formula II and an aniline derivative of formula III with an organic metal compound as the catalyst having a general formula I:

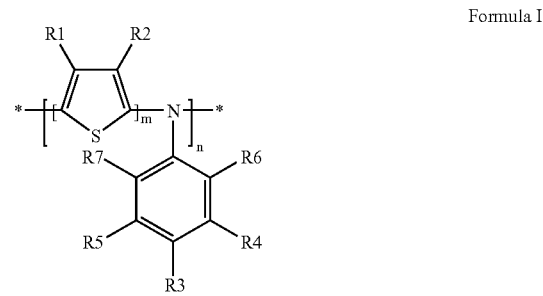

Formula I

Formula II

Formula III

Wherein: m and n each independently represents an integer and m≧1 and n≧2. R1, R2, R3, R4, R5, R6 and R7 each independently represents, hydrogen atom (but at least one of R1, R2, R3, R4, R5, R6 and R7 is not hydrogen), alkyl, alkenyl, alkynyl, aryl, alkylaryl, CN, $CF_3$, $C_nF_{2n+1}$, trifluorovinyl, $CO_2R$, C(O)R, $NR_2$, $NO_2$, OR, halo, heteroaryl, substituted aryl, substituted heteroaryl or a heterocyclic group, and additionally, or alternatively, any one or more of R1 and R2 or R7 and R5, or R5 and R3, or R3 and R4, or R4 and R6 together form, independently, a fused 5- to 6-member cyclic group, wherein said cyclic group is cycloalkyl, cycloheteroalkyl, aryl, or heteroaryl, and wherein the fused 5- to 6-member cyclic group cyclic group may be optionally substituted with one or more of alkyl, alkenyl, alkynyl, alkylaryl, CN, $CF_3$, $C_nF_{2n+1}$, trifluorovinyl, $CO_2R$, C(O)R, $NR_2$, $NO_2$, OR, halo; each R is independently H, alkyl, alkenyl, alkynyl, alkylaryl, and aryl. X represents a halide atom.

2. A copolymer as defined in claim 1, wherein R1, R2, R3, R4, R5, R6 and R7 may independently be hydrogen, substituted or unsubstituted monovalent hydrocarbon groups having typically from 1 to 30 carbon atoms, said alkyl groups are selected from methyl, ethyl, propyl, butyl, pentyl, hexyl, heptyl, octyl, decyl, dodecyl, steryl, cyclopentyl, and cyclohexyl groups, whereas said alkenyl groups are selected from: vinyl, allyl, hexenyl, heptenyl, octenyl, and aryl groups such as phenyl, alkylphenyl and alkoxyphenyl.

3. A copolymer as defined in claim 1, wherein R1, R2, R3, R4, R5, R6, and R7 are selected independently to be alkoxy group.

4. A copolymer as defined in claim 1, wherein R1, R2, R3, R4, R5, R6 and R7 are selected independently to represent any functional group such as cyano, isocyano, hydroxyl, halide, amino and sulfonate.

5. A copolymer as defined in claim 1, wherein two adjacent groups of R1, R2, R3, R4, R5, R6 and R7 are combined to form a cylco-groups or hetroatomic cyclo groups.

6. A copolymer as defined in claim 1 wherein said copolymer is chemically synthesized in chemical reactions.

7. A copolymer as defined in claim 1 where in said copolymer is soluble in common organic solvents including: chloroform, toluene, tetrahydrofuran, dichloromethane, chlorobenzene, xylene, and others.

8. A copolymer as defined in claim 1, where said electronic and opto-electronic applications include light emitting diodes, solar cells, transistors, anti-corrosion, date storage and electro-chromic windows.

* * * * *